July 15, 1952  J. F. BARNES  2,603,386
MEASURING AND DISPENSING DEVICE
Filed Oct. 4, 1946
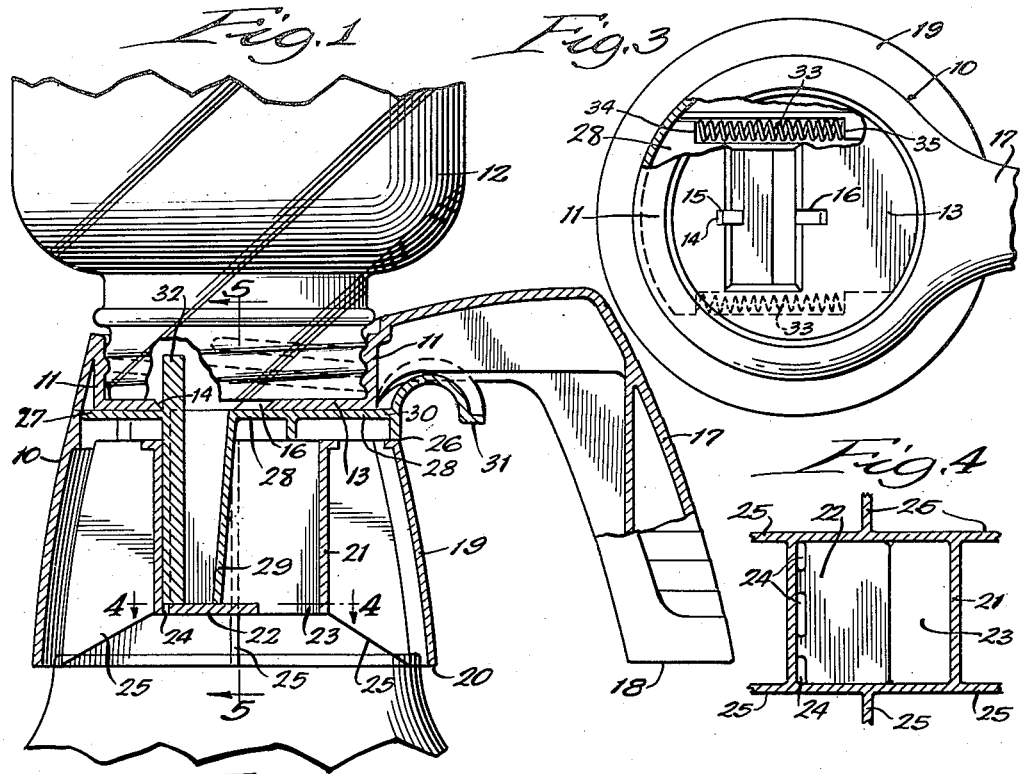
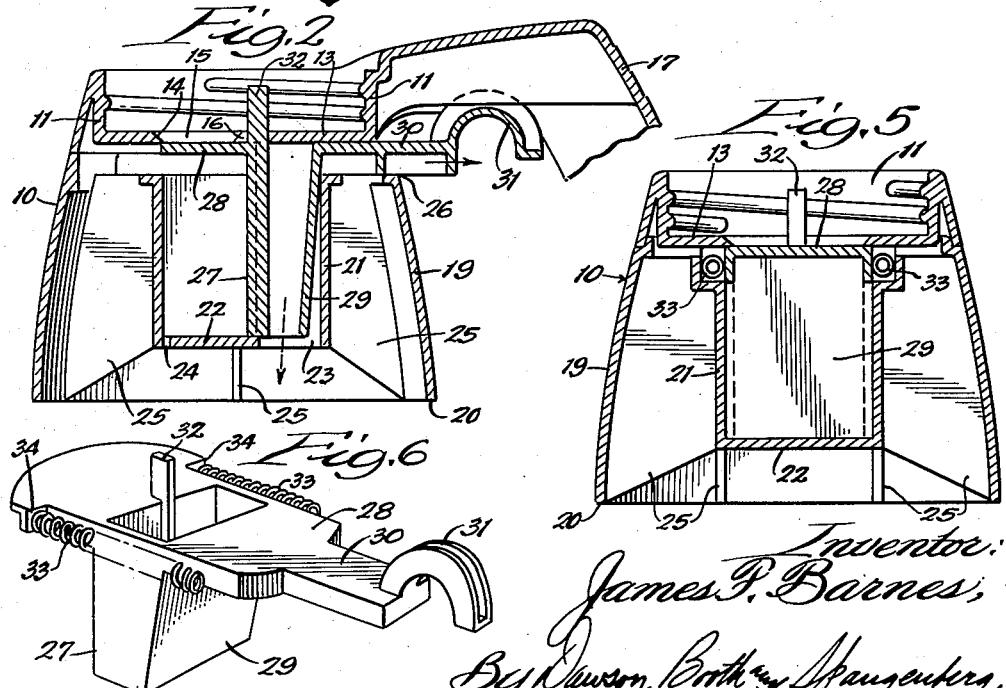
Inventor:
James F. Barnes
By Dawson, Broth...y Spangenberg,
Attorneys Patented July 15, 1952

2,603,386

UNITED STATES PATENT OFFICE 2,603,386

MEASURING AND DISPENSING DEVICE

James F. Barnes, Chicago, Ill., assignor to Barnes & Reinecke, Inc., Chicago, Ill., a corporation of Illinois Application October 4, 1946, Serial No. 701,357

1 Claim. (Cl. 222—184)

This invention relates to a measuring and dispensing device. It is particularly useful in connection with the dispensing of coffee, granular material, and other types of material.

An object of the invention is to provide a simple and compact structure providing a means for ready and accurate dispensing of material from a jar or other container. A further object is to provide a structure adapted to receive a container and to support it for the dispensing therefrom of measured amounts of material. Yet another object is to provide means for dispensing material in measured quantities within an enclosure which prevents scattering of the material and requires that it enter as an entirety the vessel below. Other specific objects and advantages will appear as the specification proceeds.

The invention is illustrated, in a preferred embodiment, by the accompanying drawing, in which:

Figure 1 is a broken vertical sectional view of apparatus shown receiving and supporting a jar and embodying my invention, the dispensing receptacle being shown in non-discharging position; Fig. 2, a view similar to Fig. 1 but showing the dispensing receptacle in discharging position; Fig. 3, a broken top plan view of the structure shown in Fig. 2; Fig. 4, a broken detail sectional view, the section being taken as indicated at line 4—4 of Fig. 1; Fig. 5, a vertical sectional view, the section being taken as indicated at line 5—5 of Fig. 1; and Fig. 6, a perspective view of a dispensing receptacle which may be employed with the apparatus embodying my invention.

In the illustration given, 10 designates a casing providing a cylindrical cap portion 11 provided with threads adapted to receive the threads of a jar 12. The cap portion 11 is provided with a bottom 13 having a discharge opening 14 extending therethrough. Communicating with the discharge opening 14 are the lateral recesses 15 and 16.

Formed integrally with the cylindrical casing portion 11 is a hollow handle 17 having a flat bottom portion 18 extending below the cylindrical cap portion 11. The casing 10 provides a skirt or inverted cup portion 19 which preferably flares outwardly to a bottom rim 20. The bottom edge 20 of the portion 19 is preferably aligned with the bottom of the handle 17 so that the handle 17 serves as a stabilizer to prevent tipping of the casing structure 10.

Mounted within the casing portion 11 and at a spaced distance below the bottom wall 13 is a casing structure providing a box or compartment 21. The box 21 has a platform 22 extending partially across the bottom of the box but leaving a discharge opening 23 at one side thereof. Preferably, the platform 22 is provided at its rear side with some openings 24 through which granular material may escape, should any collect upon the platform 22. The box 21 is preferably supported centrally within the interior of the casing portion 19 by means of webs 25.

The casing 10 is provided with a recess 26, as shown more clearly below the bottom wall 13 and adapted to slidably receive a dispensing receptacle 27. The dispensing receptacle 27 comprises a member having an upper slide body portion 28 and a depending box portion 29. Integrally connected with the body portion 28 and extending forwardly thereof is an extension 30 equipped at its forward end with a trigger or finger handle 31. Inset within the receptacle compartment is an agitator member 32 which extends above the body 28.

Any suitable means for urging the receptacle 27 toward the receiving position shown in Fig. 1 may be employed. In the illustration given, I provide a pair of compression springs 33 on either side of the body 28, each of the springs abutting at its rear a shoulder 34 provided by the body 28. At its forward end, each spring 33 abuts a fixed shoulder 35 carried by the casing 10, as shown more clearly in Fig. 3. Outward movement of the receptacle 27 compresses spring 33 against the shoulder 35 and, upon release of the receptacle, the compressed springs will restore it to the position shown in Fig. 1.

The casing and connected structure may be formed in any suitable manner and of any suitable material. For example, the upper cylindrical portion 11 together with the handle may be formed of plastic material in a single mold, while the remaining portion of the casing 10 extending therebelow may be similarly formed of plastic in a single mold. Likewise, the dispensing receptacle 27 may be formed. The receptacle 27 may then be placed in position within the box structure 21, and the upper cylindrical portion 11 may then be united to the lower portion 19 by means of solvent, cements, etc. If desired, the structure may be formed of metal and the two casing parts united after the dispensing receptacle has been placed within the lower casing portion 19. It will be understood that the complete structure as illustrated may be formed in a variety of ways and that a large number of materials may be employed.

Operation

In the operation of the device, coffee or other material to be dispensed is placed within the jar 12 and the jar is closed by the structure shown. In this operation, preferably the jar is left in its normal vertical position, and the casing structure 10 is inverted and screwed upon the threaded top of the jar. The jar and casing structure 10 may then be inverted to the position shown in Fig. 2. In this position, the entire structure can be placed upon a shelf ready for use. In such position of rest, the wide skirt 19 together with the laterally-extending handle rest 17 prevent tipping of the structure and provide a sturdy base for the support of jar 12.

In the position illustrated in Fig. 1, coffee or other material to be dispensed flows downwardly into the receptacle chamber to fill it. When it is desired to dispense the amount of material contained within the receptacle, the handle 17 is grasped and the portion 19 brought over a vessel into which the coffee or other material is to be dispensed, as illustrated in Fig. 1. The finger handle 31 is engaged by the forefinger and drawn toward the handle in a squeezing action. This moves the receptacle 27 from the position shown in Fig. 1 to the dispensing position shown in Fig. 2 and the contents of the receptacle fall downwardly into the vessel below. In the latter action, the rearwardly-extending body portion 28, as shown more clearly in Fig. 2, provides a seal which closes off the discharge opening 14 in the bottom wall 13 and prevents the outflow of granular material. Should any material leak through, it will fall upon the platform 22 and will be discharged through the openings 24 upon rearward movement of the receptacle 27. When the finger handle 31 is released, the springs 33, which have been compressed by the above action between shoulders 34 and 35, urge the receptacle 27 back to the position shown in Fig. 1 and again the coffee or other material to be dispensed will flow downwardly into the receptacle chamber to fill it.

During the above dispensing and return operations, the upwardly-extending member 32 which passes through the discharge opening 14 of the wall 13 engages the coffee and agitates it, thus breaking up any tendency of the coffee to cake and fail to flow into the receptacle.

While in the drawings, I have shown a cylindrical casing portion 11 adapted to receive the threaded end of the jar 12, it will be understood that any other interlocking means may be provided for the reception of the container. The container may be of any type or character and the casing portion 11 may be of any corresponding shape or provided with any suitable interlocking means for engaging and securing the container thereto.

The structure is simple, compact, and operates with high efficiency. It provides a sturdy support for the container when the same is not being used and a member easy to grasp and operate in the dispensing operation when a measured quantity of the material within the container is to be introduced into a vessel.

While in the foregoing description, I have set forth one embodiment of the invention in great detail for the purpose of illustration, it will be understood that such details may be varied widely by those skilled in the art without departing from the spirit of my invention.

I claim:

A measuring and dispensing device for granulated materials, comprising a casing providing a threaded neck adapted to receive the threaded end of a jar, a handle integrally formed with said neck and extending laterally and downwardly therefrom, a skirt depending from said neck and having a flared lower end terminating in substantially alignment with the lower end of said handle whereby said device may stand upon the flared lower end of said skirt and said handle will lend stability to said device, said skirt having a lateral aperture therein adapted to receive an operating slide member, an operating slide member slidably mounted within said aperture and extending outwardly therefrom and terminating in a finger handle adjacent said first-mentioned handle, a measuring receptacle slidably mounted within said casing below said neck and being secured to said operating slide member whereby movement of said slide member moves said measuring receptacle, a platform provided by said casing for closing the bottom of said receptacle while in one position but permitting the contents of the receptacle to be discharged when said receptacle is moved by said operating slide member to a position laterally of said platform, said receptacle having its side wall adjacent the opening through which said material is discharged inclined downwardly and inwardly toward the opposite side, said threaded neck also providing an opening therein communicating with said measuring receptacle when the bottom of said receptacle is closed by said platform whereby material in said jar may enter said receptacle, an agitator mounted within said receptacle and extending upwardly therefrom and through the opening provided by said neck, said operating slide member having a portion extending rearwardly of said receptacle to close the opening in said neck leading into said jar when the receptacle is moved laterally into a position to discharge the contents thereof, said platform having a plurality of spaced-apart apertures therein adjacent the edge away from the opening through which material is discharged, and springs in engagement with said operating slide members and normally urging said slide member into a position closing the bottom of said receptacle.

JAMES F. BARNES.

REFERENCES CITED

The following references are of record in the file of this patent:

UNITED STATES PATENTS

| Number | Name | Date |
| --- | --- | --- |
| 464,823 | Foster | Dec. 8, 1891 |
| 714,026 | Perkins | Nov. 18, 1902 |
| 1,002,150 | Henriquez | Aug. 29, 1911 |
| 1,361,146 | Egnatoff | Dec. 7, 1920 |
| 1,708,130 | Guest | Apr. 9, 1929 |
| 1,904,756 | Wooster | Apr. 18, 1933 |
| 1,999,624 | Biazzi | Apr. 30, 1935 |
| 2,005,919 | Militello | June 25, 1935 |